Patented Mar. 6, 1951

2,544,585

UNITED STATES PATENT OFFICE 2,544,585

ADHESIVE OF WATER REMOISTENABLE TYPE FROM LIGNIN SULFONIC ACID AND POLYVINYL ALCOHOL AND PROCESS INVOLVED IN ITS PREPARATION AND USE

Donald S. Bruce and Howard L. Heise, Troy, Ohio, assignors to Gummed Products Company, Troy, Ohio, a corporation of Ohio No Drawing. Application October 12, 1948, Serial No. 54,196

3 Claims. (Cl. 260—17.5)

Our invention relates to adhesives of water remoistenable type from lignin sulfonic acid and polyvinyl alcohol and to processes involved in their preparation and use.

Our invention further relates to such an adhesive wherein ingredients are added whereby an insolubilizing effect of controlled character is brought about.

Up to the time of our invention as set forth herein the use of an adhesive of water remoistenable type from lignin sulfonic acid and polyvinyl alcohol, such as is disclosed in our United States Letters Patent No. 2,443,889 issued June 22, 1948, has been in the field of gummed tape manufacture as a replacement for animal glue, starch, dextrine and other established water soluble adhesives.

Aside from the above there are fields where it is desirable or mandatory to provide an adhesive wherein the glue line possesses a degree of resistance to the action of water. It is to the provision of this type of adhesive that our invention is directed and it involves not only the incorporation of insolubilizing ingredients but also involves the incorporation of an ingredient which when once added obviates a progressive tendency of the insolubilizing ingredient. Since in the accomplishing of the foregoing result there are steps in the application of the adhesive which involve control of the conditions of processing, our invention may have process aspects as well as involving a new composition of matter.

We have found that when a hygroscopicity inhibiting agent such as aluminum sulphate is used with our combination of P. V. A. and sulphite waste liquor comprising lignin sulfonic acid, the adhesive gradually becomes an insoluble gel, progression to the gel state being accelerated with increase in temperature. The practical application of this finding can be accomplished by maintaining the adhesive bath at as low a temperature as is practical for application (150° F. plus). An example of such an operation is in the production of laminated board where provision for heat treatment after application of the adhesive is provided. An example of the type of composition referred to follows:

Example No. 1

| | Parts |
|---|---|
| 1. 50% aqueous concentrate of sulphite waste comprising about 70% lignin sulfonic acid | 220 |
| 2. Wetting agent | 1 |
| 3. Dry sulphite waste comprising about 70% lignin sulfonic acid | 36 |
| 4. 25% solution P. V. A. containing a relatively large percentage of medium viscosity | 75 |
| 5. Aluminum sulphate | 28 |
| 6. Water for aluminum sulphate | 52 |

Our preferred use of wetting agent is in the order of 1 part in the examples noted of a type listed in the publication entitled "Du Pont Products Index" for June 1946, page 186, as MP-189.

The proportions cited are merely for a specific example, variations to the extent of 50 percent of the ingredients (less or more) still retain the preferred physical properties of the adhesive to a substantial degree.

Mixing is accomplished in the following manner: 1 is placed in mixer, 2 added followed by 3; temperature raised to 180° F. and mixing continued to complete solution of 3; 4 added as hot solution (180° F.), temperature raised to 190–200° F.; and 5 and 6 added as a hot solution (190–200° F.). Mixing continued for 15 minutes and temperature reduced to proper level for application.

Concerning the chemistry of the above described finding, it is our opinion that the insolubilizing effect of the aluminum sulphate is due principally because of its effect on the P. V. A., but since the P. V. A. and waste are so closely associated the practical result is to render the entire adhesive composition insoluble. Apparently the action of the aluminum sulphate is to liberate through hydrolysis a portion of free sulphuric acid, which becomes the active agent in promoting molecular growth of the P. V. A. to a point where it is no longer soluble. Like most similar reactions the process is accelerated by heat, particularly in the presence of moisture.

The foregoing can be substantiated, at least in part, by a similar insolubilizing effect we have observed when a small portion of mineral acid such as sulphuric, phosphoric or hydrochloric is added to our adhesive composition. Therefore, it would appear that adhesives of this type can be rendered insoluble at a controllable rate by the addition of a predetermined amount of either a salt of a strong acid and weak base, such as aluminum sulphate, or a mineral acid such as sulphuric.

In further support of the foregoing we have found that when sealing tape gummed with an adhesive of this type, as produced under our Patent No. 2,443,889, the adhesive film when wet with water containing mineral acid, will acquire a marked degree of insolubility on drying after application. Thus the insolubilizing of the adhesive may be controlled. We have found a 5% solution of hydrochloric acid best suited to this practice, because being volatile in nature, deeper penetration, and thus more thorough treatment of the adhesive film, is accomplished.

We have noted that some of the adhesives, particularly those made with aluminum sulphate, are much tougher than their counterparts made with disodium phosphate. Since wet toughness is desirable, particularly for gummed tape, we take advantage of this characteristic, but avoid the progressive insolubilizing effect of the aluminum sulphate.

We have found that by adjusting the pH with caustic solution (NaOH) from 4.5 to 5.5 we can delay the tendency toward insolubility, but that part of the wet toughness is lost in the process.

We have further discovered that the addition of urea ($NH_2CONH_2$) to a stock containing aluminum sulphate will serve to inhibit the progressive action toward insolubility, and this without any appreciable effect on the pH. An example of an adhesive containing urea follows:

The concentration and analysis of the ingredients follows that shown for Example No. 1.

*Example No. 2*

| | Parts |
|---|---|
| 1. Concentrate of sulphite waste | 220 |
| 2. Wetting agent | 1 |
| 3. Dry sulphite waste | 36 |
| 4. 25% solution P. V. A. | 75 |
| 5. Alum | 14 |
| 6. Water for alum | 26 |
| 7. Urea | 10 |

Mixing is accomplished in a manner similar to our first example, urea being added last and at a point where the effect of the aluminum sulphate has progressed to a desirable point. While we have particularly described our product and its preparation with respect to aluminum sulphate, other common alums or mixtures with other alums may be employed. Also substitutes for the urea may be employed which have a similar property of fixing the insolubilizing tendency of the alum. Another such material which we have found effective in fixing the insolubility of the alum is dicyandiamide.

An important feature of the foregoing described use of urea is that when urea is added in sufficient amount the progressive action of the alum ingredient is completely halted. Thus it is possible by proper control of time and temperature of cook, after addition of the alum during the preparation of the adhesive to arrive at a predetermined quality of gum, and then by the addition of urea arrest the action of the alum and insure the properties attained. Common alums include any of a series of double salts isomorphous with potash alum, which may contain analogous elements in place of the potassium aluminum and sulphur; as soda alum, chrome alum, and selenium alum.

It should be pointed out that although we have cited the alums in connection with the use of urea, this chemical as well as its substitutes has a stabilizing effect on all P. V. A.—sulphite waste adhesives showing an acid pH irrespective of the source of the acid content. Thus we have found urea or its substitutes effective in our composition containing disodium phosphate as outlined in our Patent No. 2,443,889.

In the specific example the percentages of the ingredients can be varied about 50 percent either way (more or less) without materially affecting the properties of the composition.

Having thus described our invention what we claim as new and desire to secure by Letters Patent is:

1. An adhesive composition the active adhesive agent therein consisting, on a dry basis, of about three percent polyvinyl alcohol, about fifty percent of a concentrate of waste sulphite liquor comprising lignin sulfonic acid and from five to fifteen percent of an alum of the isomorphic class consisting in potash alum, soda alum, chrome alum and selenium alum, said alum being fixed as to its insolubilizing effect by the addition to the composition of about five percent of urea.

2. In the process of fixing the insolubilizing tendency of an alum of the isomorphic class consisting in potash alum, soda alum, chrome alum and selenium alum which has been added to an adhesive composition of the water remoistenable type composed of lignin sulfonic acid and polyvinyl alcohol, the steps which include mixing the ingredients excepting the alum at a temperature of about 180° F., then raising the temperature to about 200° F., adding the alum and thereafter adding urea in a percentage which fixes any further insolubilizing tendency of the alum.

3. An adhesive composition of the water remoistenable type comprising lignin sulfonic acid and polyvinyl alcohol and containing, as a hygroscopicity inhibitor, a salt of a strong acid and weak base, such salt being of the class consisting in isomorphic alums of the class consisting in potash alum, soda alum, chrome alum and selenium alum, the hygroscopical inhibitive effect of such inhibitor being fixed by the addition of an insolubilizing fixing ingredient of the class consisting in urea and dicyandiamide.

DONALD S. BRUCE.
HOWARD L. HEISE.

REFERENCES CITED

The following references are of record in the file of this patent:

UNITED STATES PATENTS

| Number | Name | Date |
|---|---|---|
| 2,111,272 | Paulson | Mar. 15, 1938 |
| 2,443,889 | Bruce | June 22, 1948 |
| 2,457,357 | Fenn | Dec. 28, 1948 |